United States Patent [19]

Yamaguchi

[11] Patent Number: 5,367,387
[45] Date of Patent: Nov. 22, 1994

[54] COLOR IMAGE FORMING APPARATUS FOR REPRODUCING COLOR IMAGE WITH HIGH REPRODUCIBILITY

[75] Inventor: Toshiyuki Yamaguchi, Toyoake, Japan

[73] Assignee: Brother Kogyo Kabushiki Kaisha, Nagoya, Japan

[21] Appl. No.: 821,087

[22] Filed: Jan. 16, 1992

[30] Foreign Application Priority Data

Jan. 16, 1991 [JP] Japan .................................. 3-003170

[51] Int. Cl.5 .............................................. G03F 3/08
[52] U.S. Cl. .................................. 358/518; 358/523; 358/501; 358/505
[58] Field of Search ................ 358/75, 80, 78, 500, 358/518, 519, 520, 523, 524, 501, 525

[56] References Cited

U.S. PATENT DOCUMENTS

| | | | |
|---|---|---|---|
| 4,458,265 | 7/1984 | Yoshida et al. | 358/80 |
| 4,751,353 | 6/1988 | Myers | 358/520 |
| 4,811,108 | 3/1989 | Numakura et al. | 358/546 |
| 4,833,546 | 5/1989 | Numakura et al. | 358/75 |
| 4,924,323 | 5/1990 | Numakura et al. | 358/456 |
| 4,956,718 | 9/1990 | Numakura et al. | 358/456 |
| 4,959,711 | 9/1990 | Hung et al. | 358/80 |
| 4,977,448 | 12/1990 | Murata et al. | 358/75 |
| 5,072,305 | 12/1991 | Numakura et al. | 358/80 |
| 5,109,275 | 4/1992 | Naka et al. | 358/75 |
| 5,140,413 | 8/1992 | Suzuki et al. | 358/75 |
| 5,142,356 | 8/1992 | Usami et al. | 358/80 |

Primary Examiner—Edward L. Coles, Sr.
Assistant Examiner—Fan Lee
Attorney, Agent, or Firm—Oliff & Berridge

[57] ABSTRACT

The present invention provides a color image forming apparatus. According to the image forming apparatus, an image reader receives a picture element color data for each picture element color of an original color image on the original. An image processor calculates a control signal from the picture element color data, on the basis of information regarding of a color state, in a human visual sense, of the corresponding picture element color on the original. Then, an image recorder records a color image on the image output medium on the basis of the control signal. Therefore, the image forming apparatus can accurately reproduce a human visual sensed color on the original with high reprodubility, and therefore can reproduce the original color image with high reproducibility irrespective of the kind of original.

24 Claims, 6 Drawing Sheets

COLOR IMAGE FORMING APPARATUS FOR REPRODUCING COLOR IMAGE WITH HIGH REPRODUCIBILITY

BACKGROUND OF THE INVENTION

This invention relates to a color image forming apparatus, and more particularly to a color image forming apparatus capable of reproducing a color image with high reproducibility irrespective of the kind of an original.

There has been known an image forming apparatus including an image reader and an image recording portion. In the image forming apparatus, an original color image formed on an original (image input medium) such as a color photographic film, television, copy sheet or the like is read out by the image reader to obtain an original image color data for each picture element, the original image color data consisting of data of three color components (red, green and blue) of the color of the picture element. The original image color data is transformed or color-proofed into a printing control data consisting of three colors (cyan, magenta and yellow) printing signals. The printing control data is adapted for controlling the recording portion of the image forming apparatus to record a color image on a recording medium (image output medium) with cyan, magenta and yellow color toners or inks. The color image thus formed on the recording medium has the same colors as the original image formed on the image input medium. As a result, the original image formed on the image input medium is reproduced on the image output medium. The image output medium is, for example, a copy sheet, a television, coated or non-coated sheet, or the like.

In this description, each of the image input medium and the image output medium is defined as a medium for forming or producing a visible color image thereon. The medium is referred to as an "image input medium" when the medium is used as an original having an original color image which is and read by the image reader to be reproduced by the image forming apparatus. The medium is referred to as an "image output medium" when the medium is used as a recording medium on which the original image is to be reproduced.

Color-reproducible ranges for the image input and output media are determined in accordance with both kinds of support material for bearing the image thereon and kinds of image forming systems adapted for forming the image (e.g., kinds of used color materials). Kinds of image input and output media such as, color photographic film, copy sheet, television, printed sheet or the like, are determined in accordance with the kinds of both image bearing support material and image forming systems. Therefore, the color-reproducible ranges of the image input and output media are determined in accordance with the kinds of image input and output media. In the above-described image forming apparatus, inconsistency in color (i.e., color error or color difference) between the original color image on the image input medium and the image reproduced on the image output medium frequently occurs when the color-reproducible range (gamut) of the image input medium is inconsistent with that of the image output medium. For example, a color of the image input medium is recorded on the image output medium with insufficient color-reproducibility, i.e., in the case where the color of the image input medium which is, located inside the gamut of the image input medium, is located outside the gamut of the image output medium.

Various techniques (i.e., color-correcting techniques) for correcting the original image color data have been utilized to correct such a color-inconsistency and improve the color-reproducibility of the original image.

One of the known color-correcting techniques is a color compression technique (i.e., a data-compression transform technique). According to the data-compression transform technique, in a color space, a color point representing the original image color is shifted in a direction toward a predetermined achromtic (neutral) color point to a color-compressed color point which is located within the color-reproducible range of the image output medium. In other words, in the color-compression process, the color point defined by the original image color data which is within the color-reproducible range (gamut) of the image input medium but out of the color-reproducible range (gamut) of the image output medium is shifted (color-compressed) to another color point which is within the gamut of the image output medium.

In this description, the achromatic color (or neutral color) is defined as a color having a lightness, but no hue and chromaticness (saturation). White, gray and black colors belong to the achromatic color, and are decreased in lightness in this order. In the following description, a color axis on which achromatic colors having various lightnesses (white, gray and black) are located, is referred to as the "achromatic color axis". An achromatic color on the achromatic color axis is shifted up to the white color as a lightness thereof is increased, and down to the black color as the lightness is decreased.

Thus obtained data of color-compressed color is then color-proofed to produce the printing control data for driving the recording means to record or reproduce the color-compressed color on the image output medium.

The conventional image forming apparatus, however, has the following disadvantages.

Usually, the image reader installed in the conventional image forming apparatus does not satisfy Luther conditions. In other words, spectral sensitivity of the image reader is different from that of the human visual sensitivity which is represented by color matching functions such as $x(\lambda)$, $y(\lambda)$ and $z(\lambda)$ defined in XYZ colorimetric system, $r(\lambda)$, $g(\lambda)$ and $b(\lambda)$ defined in RGB colorimetric system, and the like which can be converted one to from another through linear conversion. (In this description, the color matching functions such as $x(\lambda)$, $y(\lambda)$ and $z(\lambda)$ are defined as the tristimulus values for human eyes obtained from a monochromatic component of equienergy spectrum.) The original image color data (R, G, B) obtained by the image reader, therefore, fails to represent the human visually sensed color on the original.

It is noted, furthermore, that spectral reflection characteristics of color materials used in the originals are different from one another, in the case where the kinds of the originals, i.e., the kinds of the used color materials are different from one another. The original image color data (R, G, B) is obtained dependently both on the spectral sensitivity of the image reader and the spectral reflection characteristics of the color materials on the originals. On the other hand, the human visual sensed color, represented by the tristimulus values (X,Y,Z), is determined dependently on the spectral sensitivity of the human eyes represented by the color matching functions x(λ), y(λ), z(λ) and the spectral reflection characteristics of the color materials on the originals.

Accordingly, such a case may occur that although the colors on different kinds of originals are sensed by human eyes as equal to one another, the original image color data obtained therefor have values different from one another. Another case may further occur that although the colors on the different kinds of originals are sensed by human eyes to be different from one another, the original image color data obtained therefor have the same values.

According to the conventional image forming apparatus, the color-correcting operation is applied to the original image color data obtained through the image reader, as described above. Through the color-correcting operation, the printing control data corresponding to the original image color data is obtained. Since the color-correcting operation is not applied to the human visually sensed true color on the originals, it is impossible to obtain such a printing control data that properly corresponds to the visually sensed color and therefore it is impossible to reproduce the colors on the originals with sufficient reproducibility. For example, in the case where colors on the different kinds of originals are visually sensed to be equal to one another but the original image color data obtained therefor are different from one another, the printing control data obtained for the original image color data are different from one another, so that the colors reproduced in accordance with the printing control data are made different from one another. Furthermore, in the case where colors on the different kinds of originals are visually sensed to be different from one another but the same original image color data are obtained therefor, the same printing control data are obtained, and the same colors are reproduced in accordance therewith.

As is apparent from the above, according to the conventional image forming apparatus, it is impossible to obtain the printing control data properly corresponding to the visually sensed color states of the colors on the originals. Therefore, it is impossible to reproduce the colors on the originals with sufficient reproducibility, in a human visual sense. In addition, the reproducibility largely varies dependently on the kinds of the originals, i.e., the kinds of the color materials. Therefore, it is impossible to reproduce the colors on the different kinds of originals with constant high reproducibility.

SUMMARY OF THE INVENTION

An object of this invention is to provide an image forming apparatus which is capable of reproducing, with high reproducibility, a color on the original in human visual sense and therefore capable of reproducing a color image with excellent color-reproducibility irrespective of the kind of an original. That is, the object of the present invention is to provide an image forming apparatus capable of certainly attaining excellent color reproducibility for any kind of original.

In order to attain the above object, according to a main concept of the present invention, the printing control data is obtained on the basis of information on the color state in a human visual sense of the color on the original which corresponds to the original image color data.

More specifically, according to the concept of the present invention, the original image color data is converted into another color data accurately representing the human visual sense of the color on the original, before being subjected to the color-correcting operation. The color data representing the human visual sense of the color (which will be referred to as "human visual sense color data") is determined based on the color matching functions representing the human visual sensitivities. The color matching functions are such as x(λ), y(λ) and z(λ) defined in the XYZ colorimetric system, r(λ), g(λ) and b(λ) defined in the RGB colorimetric system, and the like which can be converted, one from another, through linear conversion. For example, the human visual sense color data is defined in a CIE 1931 standard colorimetric system (or XYZ colorimetric system), a CIE 1976 colorimetric system (or L*a*b* colorimetric system), or the like which can be transformed through linear conversion one from another.

The manner of converting the original image color data into the human visual sense color data is determined dependently on the kind of the originals, i.e., the kind of the used color materials. That is, the converting manner depends on the spectral reflection characteristics of the color materials of the originals. The converting manner is in the form of a nonlinear polynomial approximation expression determined dependently on the spectral reflection characteristics of the color materials of the originals.

Thus obtained human visual sense color data is then subjected to the color-correcting operation so that the printing control data is obtained. Therefore, according to the present invention, it is possible to reproduce the colors on the originals with sufficient constant reproducibility, irrespective of the kinds of the originals.

Accordingly, the present invention provides a color image forming apparatus for receiving a first picture element color data representative of a color of each picture element of an original color image formed on an image input medium and forming, on an image output medium, a color image corresponding to the original color image, the color image forming apparatus comprising: input means for receiving the first picture element color data for the corresponding picture element color of the original color image; control signal producing means for producing a control signal from the first picture element color data, on the basis of information on a color state, in a human visual sense, of the each picture element color on the image input medium; and image recording means for recording a color image on the image output medium on the basis of the control signal.

The control signal producing means may include: storing means for storing a plurality of combination data, each combination data consisting of a first color data receivable by the input means and a record signal for controlling said image recording means to record a color corresponding to the first color data, the record signal being calculated, on the basis of information on a color state, in human visual sense, of a color on the image input medium corresponding to the first color data; and selecting means for selecting at least one combination data out of the plural combination data, in accordance with the first picture element color data, to thereby produce the control signal corresponding to the first picture element color data.

Alternatively, the control signal producing means may convert the first picture element color data into a second picture element color data representative of the color state, in a human visual sense, of the picture element color on the image input medium and color-corrects the second picture element color data to form the control signal.

According to another aspect of the invention, there is provided a color image forming apparatus for receiving a first picture element color data representative of a color of each picture element of an original color image formed on an image input medium and forming, on an image output medium, the color image forming apparatus comprising: input means for receiving a first picture element color data of the corresponding picture element color of the original color image; storing means for storing a plurality of groups of combination data, each group corresponding to a kind of the image input medium and consisting of a plurality of combination data, each combination data consisting of a first color data receivable by the input means and a record signal corresponding to the first color data, the record signal being calculated on the basis of a second color data representative of a color state, in a human visual sense, of a color on the corresponding kind of the image input medium corresponding to the first color data; group selecting means for selecting one group out of the plural groups, in accordance with the kind of the image input medium; combination data selecting means for selecting at least one combination data out of the plural combination data in the group selected by said group selecting means, in accordance with the first picture element color data; interpolative calculation means for calculating a control signal through interpolative process on the basis of the selected combination data; and image recording means for recording a color image on the image output medium on the basis of the control signal.

Other objects, features and advantages of the present invention will become apparent in the following specification and accompanying drawings.

DETAILED DESCRIPTION OF THE INVENTION

Figure 1:
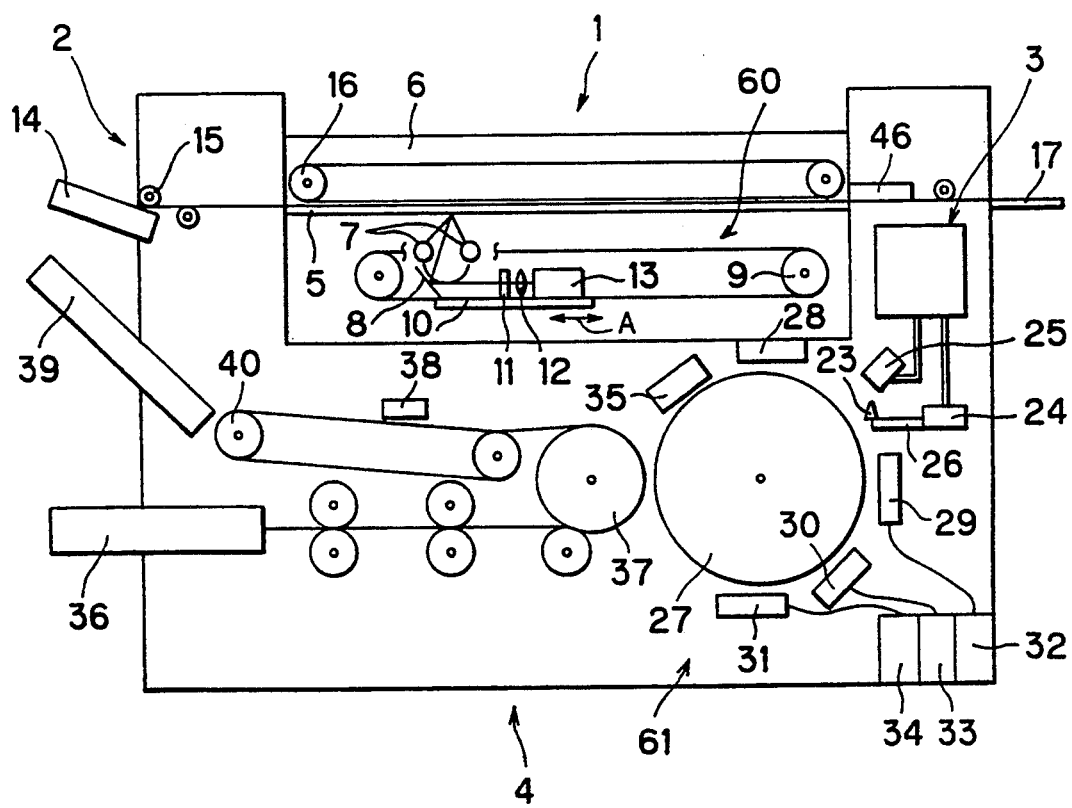
FIG. 1 shows a basic construction of a color copying machine to which is applied the image forming apparatus of the present invention.

FIG. 1 shows a representative construction of a digital color copying machine according to an embodiment of a color image recording apparatus of the present invention.

The digital color copying machine 1 includes: an original color image reading portion 2 provided at an upper side of the copying machine 1; a color image processing portion 3 provided at a right side of the copying machine 1; and a color image recording portion 4 provided at a lower side of the copying machine 1.

The original color image reading portion 2 includes: a transparent original mount 5 for mounting an original thereon; an original cover 6 for pressingly covering the original mounted on the original mount 5; an original supply stand 14 for supplying the original to the original mount 5; an original supply unit 15 provided at a right side of the original supply stand 14 for supplying the original from the original supply stand 14 to the original mount 5; an original feeding unit 16 which comprises two rollers rotated by a motor (not shown) and an endless belt suspended therebetween for feeding the original onto the original mount 5; an original discharge tray 17 provided at a right side of the original feeding unit 16 for withdrawing an exposed original; and an image reading unit 60 provided at a lower portion of the original mount 5 for exposing the original to light to obtain original image color data from the original.

The image reading unit 60 of the image reading portion 2 includes: two light sources (e.g. fluorescent lamps) 7 each extending in a main scanning direction which is parallel to a widthwise direction of the original and which is perpendicular to the direction indicated by an arrow A in FIG. 1, the two light sources 7 emitting light toward the transparent original mount 5 to expose the original to the light and scan the original with the light; a reflection mirror 8 for reflecting the light reflected from the original (which will be referred to as "original image light", hereinafter) a lens 11 for converging the original image light from the reflection mirror 8; a color filter unit 12 for separating the original image light from the lens 11 into three (red, green and blue) color components; and a solid-state image pick-up element (e.g. a line charge-coupled device (line CCD)) 13 provided behind the color filter unit 12 for receiving the separated three color components of the original image light to form an original image color data. The light sources 7, the reflection mirror 8, the lens 11, the color filter 12 and the solid-state image pick-up element 13 are mounted on a movable stand 10 which is moved by a moving unit 9 such as a pair of rotatable rollers, in an auxiliary scanning direction which is perpendicular to the main scanning direction and is indicated by the arrow A in FIG. 1.

The filter unit 12 includes three filter members for allowing only respective ones of red, green and blue color components of light to pass therethrough. The three filter members successively cover the image pick-up element 13, every time when the original image light is obtained from a single line of the original image extending in its widthwise direction which is parallel to the main scanning direction. Thus, the filter members successively allow the respective three color components of the original image light to be received by the image pick-up element 13. Accordingly, three color signals representing lightness of respective three color components of the original image light reflected from each picture element are obtained by the image pick-up element 13. The three color signals for each picture element form, in combination, an original image color data of the corresponding picture element. Since the solid-state image pick-up element 13 comprises a line CCD, the line CCD reads out the original image color data of all the picture elements positioned on each line of the original image extending in its widthwise direction, at one time.

Figure 3:
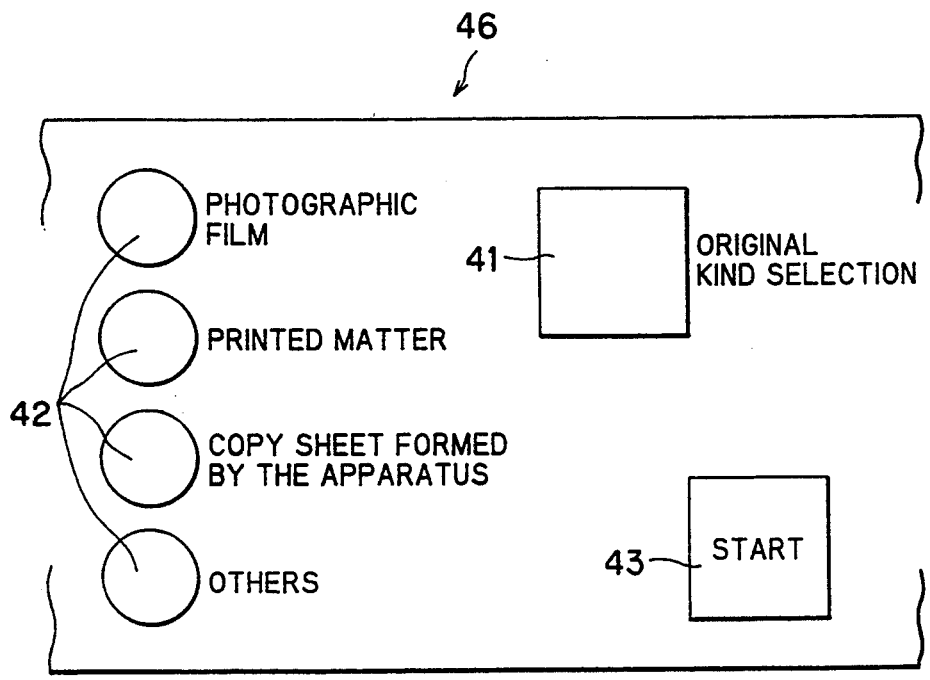
FIG. 3 shows an operational panel provided on the color copying machine.

At a right side of the original cover 6, there is provided an operational panel 46 which has a copy starting switch or button 43, an original kind selecting switch or button 41 used for selecting the kind of an original to be copied by the copying machine 1, and various indication lamps 42 for indicating the selected original kind, as shown in FIG. 3. The selected original kind indication lamps 42 indicate that the kind of the original to be copied is a photographic film, printed matter, copy sheet formed by the copying machine 1 per se, or other kinds of originals.

Figure 2:
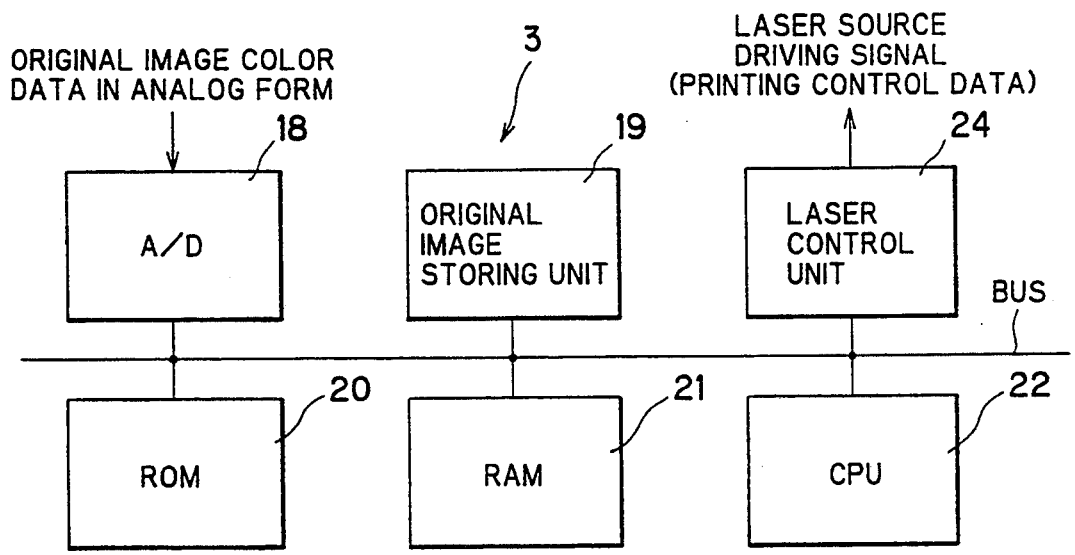
FIG. 2 is a block diagram for showing a color image processing portion of the color copying machine.

As shown in FIGS. 1 and 2, the color image processing portion 3 includes: an analog-to-digital (A/D) converter 18 for converting the original image color data obtained by the image pick-up element 13 in analog form into a digital form original image color data; an original image storing unit 19 such as an image memory or a frame memory for storing, in digital form, the original image color data obtained for all or a part of the original image; a read only memory (ROM) 2U for beforehand storing therein RGB-XYZ conversion expressions and the image input gamut data for the respective kinds of originals, XYZ-CMY relationship data, the image output gamut data, and several (RGB-CMY) combination data groups (which will be described later); a random access memory (RAM) 21 for temporarily storing various processing result data; a central processing unit (CPU) 22 for performing various image processings such as color-correcting operation using the ROM 20 and RAM 21; and a laser control unit 24 for controlling the driving of a laser source 23 provided in the image recording portion 4 on the basis of printing control data obtained through the color-correcting operation. These elements are connected to one another through a bus.

As shown in FIG. 1, the color image recording portion 4 includes: the laser source 23 for emitting a laser beam; a laser modulation unit 26 for modulating the laser beam of the laser source 23 on the basis of the printing control data (laser driving signals) outputted from the laser control unit 24 and supplying the modulated laser beam to a polygon mirror 25; an image forming unit 61 for electrostatically forming a latent image with the modulated laser beam reflected from the polygon mirror 25 and then forming a color visible image on a recording sheet with color toners; a fixing unit 38 for fixing the visible image on the sheet, and a sheet feeding unit 40 for conveying the recording sheet from a sheet supply case 36 to a discharge tray 39.

The image forming unit 61 includes: a photosensitive drum 27 which is exposed to the modulated laser beam from the polygon mirror 25 to electrostatically form the latent image thereon; a charging unit 28 for uniformly charging the photosensitive drum 27 negatively before the exposing operation; a developer unit for coating the formed latent image with color toners to form a color toner image on the photosensitive drum 27, the developer unit including a cyan developer 29 for coating cyan toners on a latent image which has been formed on the basis of a cyan printing signal of the printing control data, a magenta developer 30 for coating magenta toners on a latent image which has been formed on the basis of a magenta color printing signal of the printing control data and a yellow developer 31 for coating yellow toners on a latent image which has been formed on the basis of a yellow color printing signal of the printing control data; a toner supply unit including a cyan toner tank 32 for supplying the cyan toners to the cyan developer 29, a magenta toner tank 33 for supplying the magenta toners to the magenta developer 30 and a yellow toner tank 34 for supplying the yellow toners to the yellow developer 31; a transfer drum 37 for transferring the color toner images of cyan, magenta and yellow on the photosensitive drum 27 to a recording sheet which has been supplied by the sheet feeding unit 40; and a cleaner 35 for removing residual toners mounted on the photosensitive drum 27 after the transfer process.

In a preferred embodiment, the original with the color original image formed thereon serves as the image input medium, and a reproducible range of the image input medium (input medium gamut) is determined in accordance with the kind of image input medium (original). The recording sheet serves as an image output medium, and the reproducible range of the image output medium (output medium gamut) is determined in accordance with the kind of the recording sheet and the image forming manner utilized in the recording portion 4 to record a color image on the recording sheet.

According to the present invention, a three-dimensional RGB color space is defined as being constructed by three R, G and B axes extending orthogonally to one another. In the RGB color space, an arbitrary color point (R, G, B) represents the corresponding RGB color data (R, G, B) obtainable through the image reading portion 2 from an arbitrary color on the corresponding kind of original (which will be referred to as "RGB input color data").

The contents of the ROM 20 in the image processing portion 3 will be described below in great detail.

As described above, the ROM 20 stores therein the RGB-XYZ conversion expressions and the image input gamut data, for the respective kinds of originals, XYZ-CMY relationship data, the image output gamut data, and the (RGB-CMY) combination data groups for the respective kinds of originals.

The RGB-XYZ conversion expressions and the image input gamut data correspond to the respective kinds of originals (photographic film, printed matter, copy sheet produced by the machine 1 and other kinds of originals) selectable through the operator's manipulation of the selection button 41. Therefore, the numbers of the RGB-XYZ conversion expressions and the image input gamuts are four, respectively. Now, the manner of calculating each RGB-XYZ conversion expression and each image input gamut for a corresponding kind of original is described below. By way of example, the process of calculating one RGB-XYZ conversion expression and one image input gamut for a photographic film is described hereinafter:

First, a plurality of color chips for a photographic film are formed. The colors of the plural color chips are detected by a spectrocolorimetric detector, so that XYZ color data (X, Y, Z) defined in the CIE 1931 standard colorimetric system are obtained for the respective colors of the color chips. The detected XYZ color data are converted into L*a*b* color data defined in the CIE 1976 colorimetric system (L*a*b* colormietric system), based on which reproducible range (image input gamut) of the photographic film is obtained. Thus obtained image input gamut data for the photographic film is stored in the ROM 20.

The colors of the color chips are also detected by the image reading portion 2 of the image forming apparatus 1, so that the RGB input color data (R, G, B) are obtained for the respective colors of the color chips. Thus, the XYZ color data and the RGB color data are both obtained for each color of the color chip. Then, an RGB-XYZ conversion expression representative of relationship between the RGB input color data and the XYZ color data. In other words, a least square method operation is applied to the XYZ and RGB color data for all the colors of the color chips, so that one non-linear polynomial approximation expression is calculated for defining the relationship between all the XYZ and the RGB color data. The approximation expression is stored in the ROM 20 as the RGB-XYZ conversion expression for the photographic film.

The RGB-XYZ conversion expressions and the image input gamut data for the printed matter and the copy sheet produced by the machine 1 are also calculated in the same manner as described above. On the other hand, in order to calculate the RGB-XYZ conversion expression and the image input gamut data for the kinds of originals other than the above, the mean values of data obtained for the photographic film and the printed matter are used.

The XYZ-CMY relationship data has a single data and the image output gamut data has also a single data, since the number of the kind of the recording sheet used in the machine 1 is one. The manner of calculating the XYZ-CMY relationship data and the image output gamut data is described hereinafter:

First, all the printing control data (C, M, Y) having various values of color printing signals C, M, and Y applicable to the image recording portion 4 of the apparatus 1 are applied to the image recording portion 4, so that colors corresponding to all the printing control data (C, M, Y) are reproduced on the recording sheet. Thus, a plurality of color chips of the recording sheet are produced for representing all the colors reproducible on the recording sheet with the printing control data. Then, the colors of the plural color chips are detected by the spectrocolorimetric detector, so that XYZ color data (X', Y', Z') defined in the CIE 1931 standard colorimetric system are obtained for the respective colors of the color chips. The detected XYZ color data (X, Y, Z) are converted into L*a*b* color data defined in the CIE 1976 colorimetric system (L*a*b* colorimetric system), based on which reproducible range (image output gamut) of the recording sheet is obtained. Thus obtained image output gamut data of the recording sheet is stored in the ROM 20.

Furthermore, since the XYZ color data (X', Y', Z') is obtained for each color reproduced by the CMY printing control data (C, M, Y), there is obtained a relationship data consisting of the CMY data (C, M, Y) and the XYZ data (X', Y', Z') for each color on the recording sheet. In other words, a plurality of relationship data consisting of the plurality of CMY data and the corresponding XYZ data are obtained for the respective colors reproduced on the recording sheet. The CMY-XYZ relationship data are also stored in the ROM 20.

The (RGB-CMY) combination data groups respectively correspond to the kinds of originals (photographic film, printed matter, copy sheet produced by the machine 1 and other kinds of originals) which are selectable through the operator's manipulation of the selection button 41. Therefore, the number of the groups is four. Each group consists of a plural (RGB-CMY) combination data. Each combination data consists of an RGB input color data (R, G, B) obtainable through the image reading portion 2 from an arbitrary color on the corresponding kind of original and an CMY printing control data (C, M, Y) for controlling the image recording portion 4 to reproduce onto the recording sheet a color corresponding to the arbitrary color.

The manner or process of calculating each (RGB-CMY) combination data group for a corresponding kind of original is described below. By way of example, the process of calculating one (RGB-CMY) combination data group for a photographic film is described hereinafter, with reference to FIG. 5.

First of all, an RGB lattice color space is defined. That is, the three dimensional axes of the RGB color space are uniformly divided so that the three-dimensional RGB color space is uniformly divided into a three-dimensional RGB color lattice space.

Figure 5:
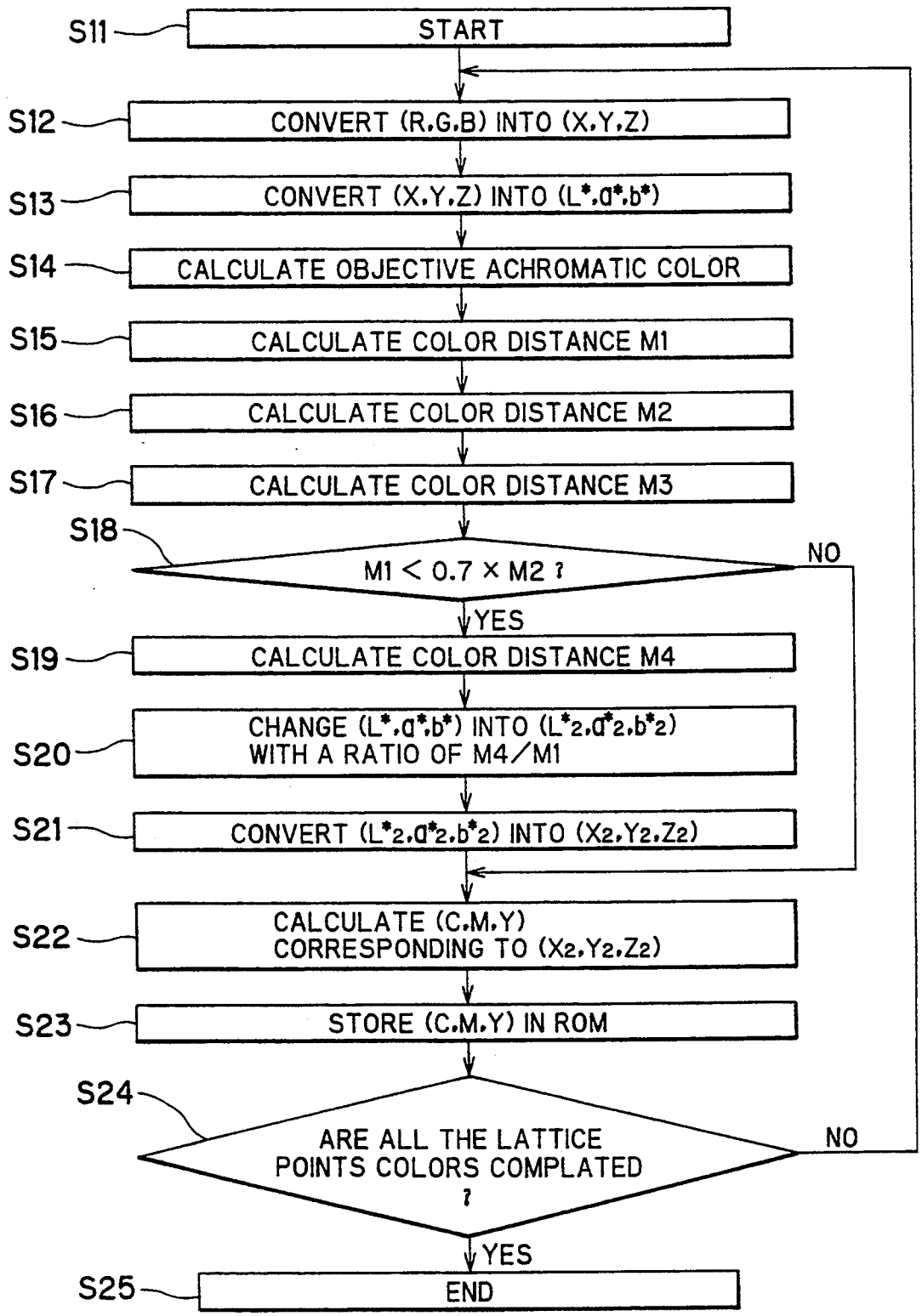
FIG. 5 is a flow chart of a (RGB-CMY) combination data group calculating process of the color copying machine.

After the (RGB-CMY) combination data group calculating process shown in FIG. 5 is started, in the step S12, the CPU 22 converts one RGB input color data (R, G, B) positioned on one lattice color point (one vertex point of each lattice) into an XYZ color data (X, Y, Z) defined in CIE 1931 standard colorimetric system (XYZ colorimetric system), using the RGB-XYZ conversion expression for the photographic film which has been previously calculated to be stored in the ROM 20 in the step S11. (A color represented by the RGB input color data will be referred to as "subject color", hereinafter) When the RGB input color data (R, G, B) for the subject color is thus converted into the XYZ color data (X, Y, Z) in the step S12, the XYZ color data (X,Y,Z) is further converted, in step S13, into a L*a*b* data (L*, a*, b*) defined in the CIE 1976 colorimetric system (L*a*b* colorimetric system), with using the following equations (1), (2) and (3).

$$L^* = 116(Y/Yn)^{\frac{1}{3}} - 16 \qquad (1)$$

$$a^* = 500 \{(X/Xn)^{\frac{1}{3}} - (Y/Yn)^{\frac{1}{3}}\} \qquad (2)$$

$$b^* = 200 \{(Y/Yn)^{\frac{1}{3}} - (Z/Zn)^{\frac{1}{3}}\} \qquad (3)$$

where, Xn, Yn and Zn are tristimulus values of the CIE 1931 standard colorimetric system for a perfect diffusion surface.

Figure 6:
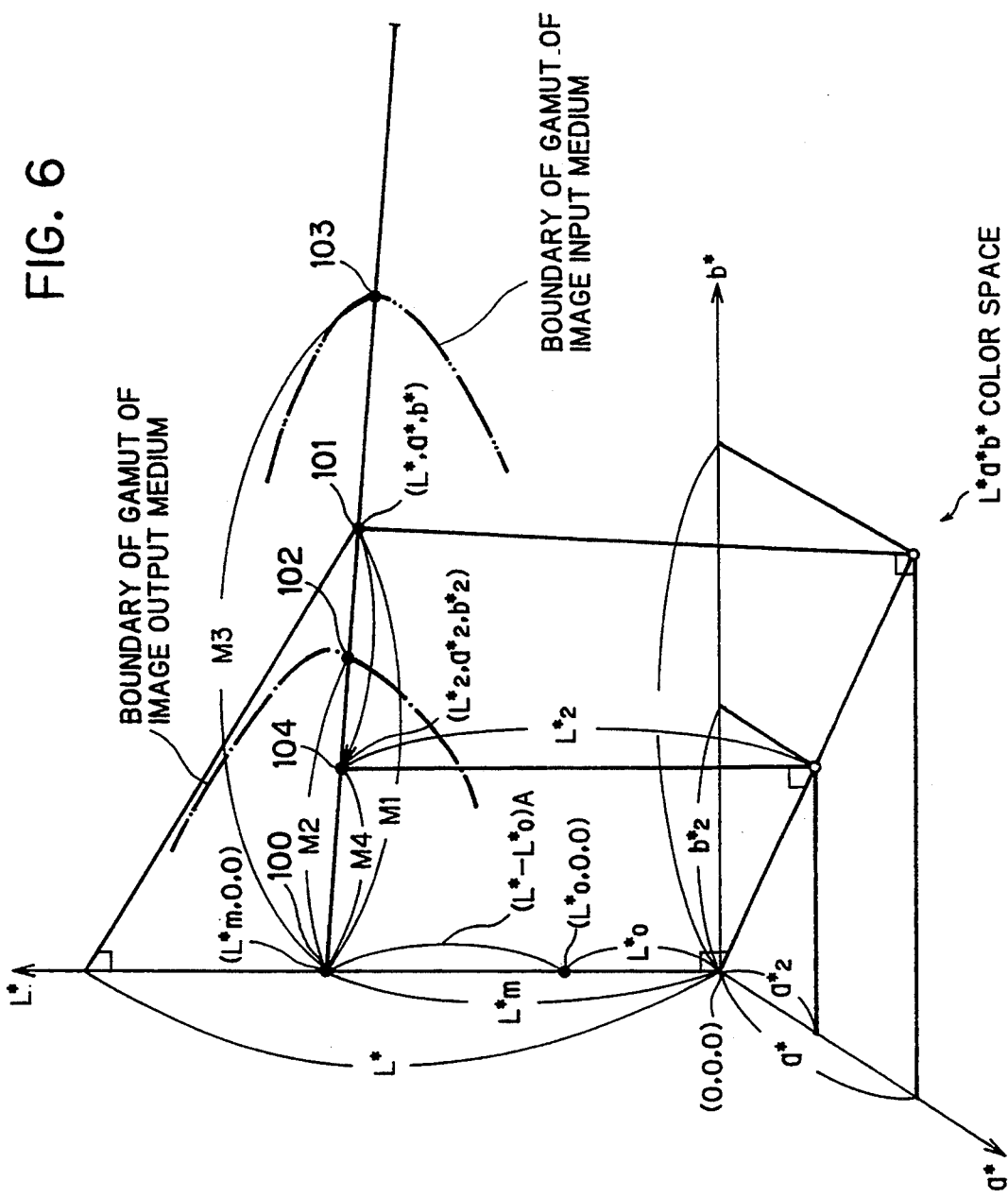
FIG. 6 shows the manner in which a subject color is color-compressed in a color space.

Then, as shown in FIG. 6, a three-dimensional L*a*b* color space is defined to be constructed by three axes of an L* axis, an a* axis, and a b* axis which extend orthogonally with one another. Then, a position 101 of the subject color is determined as (L*, a*, b*) in the L*a*b* color space.

In step S14, lightness value Lm* of an objective achromatic color which is to be used in a color-compression process (which will be described later) is calculated on the basis of the position value (L*, a*, b*) of the subject color, by the following equation (4).

$$Lm^* = L0^* + (L^* - L0^*)A \qquad (4)$$

where L0* is a constant value component (e.g., 50), and A is an adaptive value component (e.g., 0.3). That is, the lightness value of the objective achromatic color is determined depending on the lightness value L* of the subject color 101.

In a step S15, as shown in FIG. 6, a distance M1 (color difference) from the subject color 101 positioned at the point (L*, a*, b*) to the objective achromatic color 100 located at the point (Lm*, 0, 0) is obtained using the following equation (5), $$M1 = ((L^* - Lm^*)^2 + a^{*2} + b^{*2})^{\frac{1}{2}} \qquad (5)$$

In step S16, then, a distance M2 (color difference) from the objective achromatic color 100 to a color 102 which is positioned on a boundary of the color-reproducible range (gamut) of the image output medium (recording sheet) and which has the same hue and lightness directions from the objective achromatic color as those of the subject color from the objective achromatic color is obtained. In other words, the image output medium gamut boundary color 102 is positioned both on a boundary of the image output gamut and on a line C defined as connecting the subject color 101 and the objective achromatic color 100, as shown in FIG. 6. The distance M2 is therefore defined as a distance between the colors 100 and 102 along the line C. The distance M2 is calculated based on the image output gamut information which has been calculated to be stored in the ROM 20 in the step S11.

In step S17, a distance M3 (color difference) from the objective achromatic color 100 to a color 103 which is positioned on a boundary of the color-reproducible range (gamut) of the image input medium (photographic film, in this case) and which has the same hue and lightness directions from the objective achromatic color 100 as those of the subject color from the objective achromatic color 100 is obtained. The image input gamut boundary color 103 is therefore positioned also on the line C, as shown in FIG. 6. The distance M3 is calculated based on the photographic film gamut information which has been calculated to be stored in the ROM 20 in the step S11.

Next, in a step S18, it is judged whether the distance M1 of the subject color 101 from the objective achromatic color 100 is equal to or longer than a value obtained by multiplying the distance M2 by a non-compression coefficient value R of 0.7. If it is judged that the distance M1 is shorter than the value (0.7×M2), no color compression conversion is conducted for the subject color. If it is judged, however, that the M1 is equal to or longer than the value (0.7×M2), in step S19, a color compressing operation is conducted. That is, the subject color 101 is shifted along the line C in a direction toward the objective achromatic color to obtain a color-compressed subject color 104. The color-compressed color 104 has a distance M4 from the objective achromatic color 100 and is positioned on the line C. The distance M4 of the color-compressed subject color 104 from the objective achromatic color 100 is defined by the following equation (6).

$$M4 = M2 - 0.3 \cdot M2 \ (M3 - M1)/(M3 - 0.7 \cdot M2) \quad (6)$$

Figure 7:
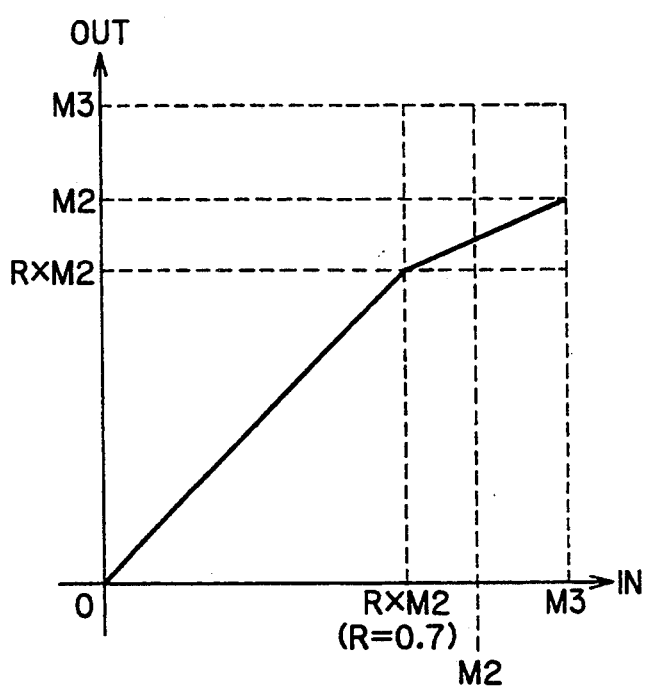
FIG. 7 is a schematic diagram for showing a color-compression transformation of the subject color.

FIG. 7 shows the color-compression relationship among the distances M1, M2, M3 and M4. Thus, as shown in FIG. 6, in the color-compression process, the subject color 101 is shifted along the line C in the direction toward the objective achromatic color 100 with a color-compression amount or degree M defined by the following equation (7), $$\begin{aligned} M &= M1 - M4 \\ &= ((L^* - Lm^*)^2 + a^{*2} + B^{*2})^{\frac{1}{2}} - \\ & \quad M2 + 0.3 \cdot M2 \cdot (M3 - M1)/(M3 - 0.7 \cdot M2) \end{aligned} \quad (7)$$

As a result, the color-compressed subject color 104 having the color distance M4 from the objective achromatic color 100 is obtained. The color-compressed subject color 104 is positioned at a point ($L^*_2, a^*_2, b^*_2$) where $L^*_2$, $a^*_2$, and $b^*_2$ satisfy the following equations (8) to (10).

$$L^*_2 = (L^* - Lm^*) M4/M1 + Lm^* \quad (8)$$

$$a^*_2 = a^* \cdot M4/M1 \quad (9)$$

$$b^*_2 = b^* \cdot M4/M1 \quad (10)$$

Therefore, in step S20, the L*a*b* color data (L*, a*, b*) defined in the CIE 1976 colorimetric system for the subject color is converted into the color-compressed L*a*b* color data ($L^*_2, a^*_2, b^*_2$).

Thereafter, in step S21, thus obtained color-compressed L*a*b* color data ($L^*_2, a^*_2, b^*_2$) is reconverted into a color-compressed XYZ color data ($X_2, Y_2, Z_2$) defined in the CIE 1931 standard colorimetric system.

In step S22, then, the CPU 22 calculates a CMY printing control data (C, M, Y) based on the color-compressed XYZ color data ($X_2, Y_2, Z_2$), with using the XYZ-CMY relationship data which has been previously calculated to be stored in the ROM 20 in the step S11. More specifically, the CPU 22 calculates a plurality of sum-square data s representative of the differences of the color-compressed XYZ color data ($X_2, Y_2, Z_2$) from the plural XYZ color data (X', Y', Z') of the XYZ-CMY relationship data, s being defined by the following equation (9):

$$s = (X_2 - X')^2 + (Y_2 - Y')^2 + (Z_2 - Z')^2 \quad (9)$$

Then, one XYZ color data (X', Y', Z') allowing the sum-square value s to be the minimum is selected out of the plural XYZ color data of the XYZ-CMY relationship data. Then, the CMY printing control data (C, M, Y) corresponding to the selected XYZ color data (X', Y', Z') is selected for the color-compressed XYZ color data ($X_2, Y_2, Z_2$).

As a result, the printing control data (C, M, Y) is obtained for the subject input color (R,,G, B) positioned on the one lattice color point in the RGB color space. Thus, one combination data consisting of one RGB input color data (R, G, B) and a CMY printing control data (C, M, Y) corresponding thereto is obtained. The (RGB-CMY) combination data is stored in the ROM 20 in step S23.

The process then proceeds to step S24 so that the above-described calculating steps S12 through S23 are repeatedly conducted until when the CMY printing control data (C, M, Y) are calculated for the RGB input color data (R, G, B) positioned on all the lattice points of the RGB lattice color space. Then, the combination data group calculation process for the photographic film is stopped in step S25, when all the (RGB-CMY) combination data of the RGB input color data and the corresponding CMY printing control data are calculated to be stored. Thus, one group consisting of all the (RGB-CMY) combination data for the photographic film is obtained to be stored in the ROM 20.

In the above-described (RGB-CMY) combination data group calculation process, each RGB input color data (R, G, B) is converted into the XYZ color data (X, Y, Z). Since the XYZ color data is defined in the CIE 1931 standard colorimetric system utilizing the color matching functions x(λ), y(λ) and z(λ), the XYZ color data (X, Y, Z) properly represents a visually sensed state of a color which is formed on the photographic film and which is to be detected by the image reading portion 2 as the RGB input color data (R, G, B). According to the present invention, since thus obtained XYZ color data is subjected to the color-compression operation, the color data representing the human visual sense state of the color is subjected to the color-compression operation. Accordingly, the color-compression operation can be properly applied to the photographic film color, and therefore it is possible to obtain the CMY printing control data capable of accurately reproducing the color of human visual sense of the photographic film onto the recording sheet. In other words, the (RGB-CMY) combination data consists of the RGB input color data and the CMY printing control data for accurately reproducing, in human visual sense, the color corresponding to the RGB input color data.

The above-described combination data group calculation process shown in FIG. 5 are conducted also for the printed matter, the copy sheet produced by the apparatus 1 per se., and other kinds of originals which are selectable by the manipulation of the selection switch 41 on the operation panel 46. Thus obtained (RGB-CMY) combination data groups for the respective kinds of originals are stored in the ROM 20.

Through the combination data group calculation processes for the respective kinds of originals, there is obtained a (RGB-CMY) combination data group for each kind of original, the each (RGB-CMY) combination data group consisting of a plurality of combination data of the RGB input 1 color data positioned on all the lattice point colors and the corresponding CMY printing control data calculated with respect to the corresponding kind of original. Each (RGB-CMY) combination data consists of the RGB input color data and the corresponding CMY printing control data. That is, the CMY printing control data will accurately reproduce onto the recording sheet the color of human visual sense on the corresponding kind of original which is to be detected by the image reading portion as the corresponding RGB input color data.

Figure 4:
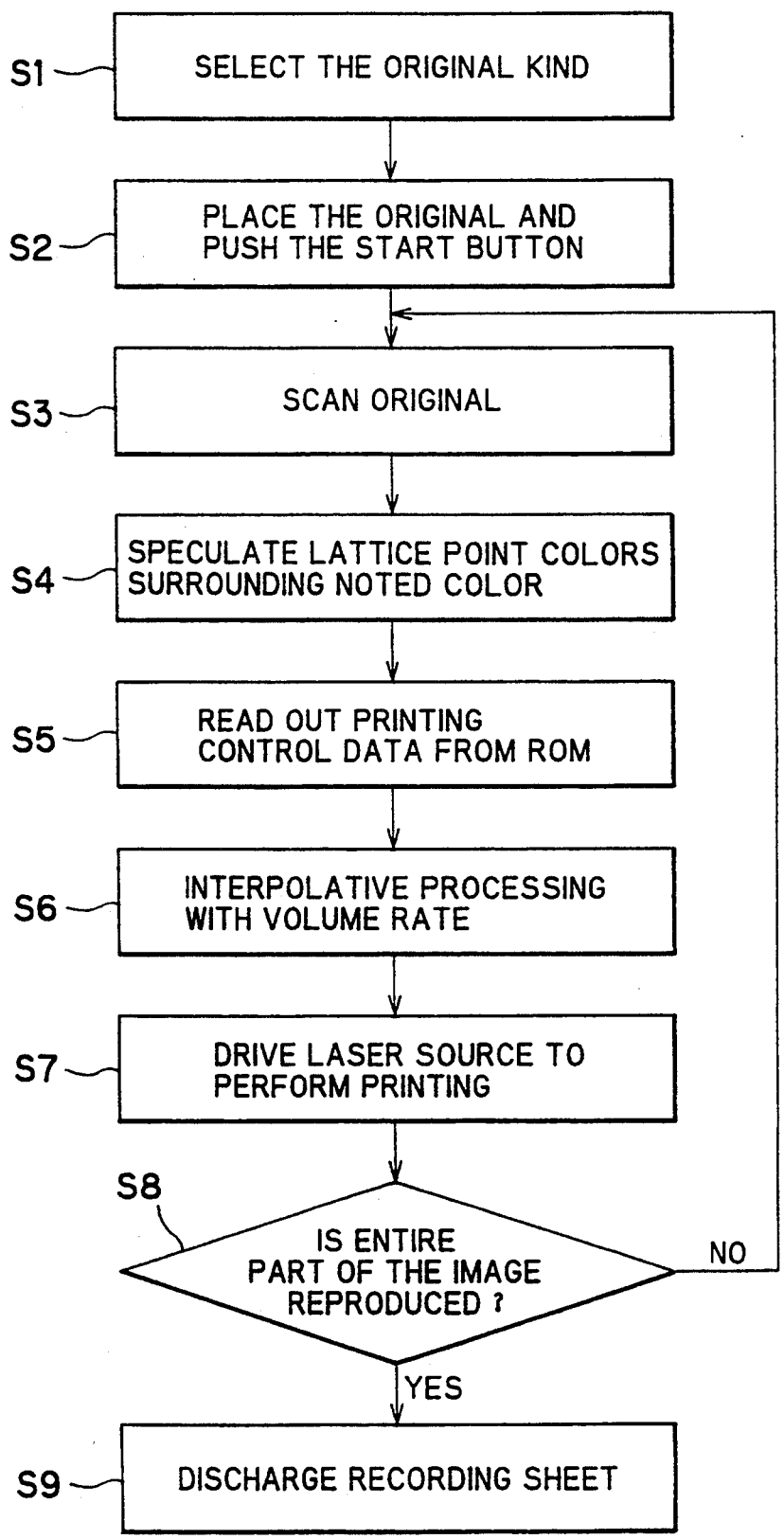
FIG. 4 is a flow chart of a color image copying process of the color copying machine.

A color image forming operation of the digital color image copying machine 1 with the above-described construction will be described with reference to the flowchart of FIG. 4.

First, a kind of the original (image input medium) to be copied by the copying machine 1 is selected by manually pushing the original kind selecting button 41 on the operation panel 46, in step S1. One of the indication lamps 42 are lighted to indicate the selected kind of the original. Then, in step S2, a color original is placed on the original supply stand 14. In response to pushing the copy starting button 43, the color original placed on the original supply stand 14 is fed onto the transparent original mount 5 by the original feeding unit 16. Alternatively, the color original may be directly placed on the transparent original stand 5 after opening the original cover 6. In this state, in step S3, the movable stand 10 is moved by the moving unit 9 in the auxiliary scanning direction so that white light emitted from the fluorescent lamps 7 scans the color original. The white light emitted from the fluorescent lamps 7 is reflected from the original to form the original image light which is then reflected at the reflection mirror 8 and passed through the lens 11 to reach the filter unit 12. The original image light formed at each picture element of the original image is separated by the filter unit 12 into three primary color components (red, green and blue), which are then received by the image pickup element 13 to be converted into (analog) electrical color-component signals. The analog color-component signals are then transferred into the image processing portion 3 where the analog color-component signals are converted into digital color-component signals R, G and B by the analog-digital converter 18. Thus, three color-component digital signals R, G and B are obtained for each of the picture elements of the original image. The three color-component digital signals R, G and B are combined into an. RGB original image color data (R, G, B) representing a color of each picture element of the original color image. The original image color data (R, G, B) for each picture element color is temporarily stored in the original image storing unit 19.

The RGB original image color data (R, G, B) for each picture element color (which will be referred to as "noted picture element color" hereinafter) can be represented by a three-dimensional color point (R, G, B) defined in the already-described RGB color lattice space. Therefore, it is judged, in step S4, which lattice of the RGB color lattice space includes the color point of each original image color data point (R, G, B). In other words, it is judged which eight number of colors located at lattice points (vertex points of a lattice) surround the noted color point.

Then, one group is selected out of the several (RGB-CMY) combination data groups stored in the ROM 20, in accordance with the kind of the original selected in the step S1. Then, in step S5, the CMY printing control data (C, M, Y) corresponding to the eight lattice point colors surrounding the noted color are respectively read out from the selected one (RGB-CMY) combination data group, since the one (RGB-CMY) combination data group consists of all the RGB lattice point colors and the corresponding CMY printing control data.

In step S6, then, interpolative processing is carried out for the eight CMY printing control data, using the following equation (10), to thus obtain a CMY printing control data (C, M, Y) for the noted color, the printing control data (C, M, Y) consisting of three color printing signals C, M and Y.

$$Di = \left\{ \sum_{j=1}^{8} (Mj \times Lij) \right\} / \sum_{j=1}^{8} Mj$$

where Lij (i=C, M, Y; j represents each one of the eight lattice point colors surrounding the noted color) represents a color printing signal C, M or Y for the color located at each lattice point, Mj represents a volume of a rectangular parallelpiped lattice space which includes diagonal lattice points and the noted color point, and Di represents a color printing signal C, M or Y for the noted color.

The CMY printing control data (C, M, Y) consisting of the three color printing signals C, M and Y are thus obtained for the noted color, and is transmitted to the laser control unit 24.

In step S7, the cyan, magenta and yellow color printing signals C, M, and Y of the printing control data for the noted picture element color are respectively transmitted to the laser control unit 24, and a laser light is emitted responsive to each of the color printing signals C, M, and Y. The laser light is reflected from the polygon mirror 25, and then irradiated to the photosensitive drum 27 which has been uniformly charged by the charger 28, thereby forming a latent picture element image on the photosensitive drum 27.

The latent picture element image thus formed on the photosensitive drum 27 in accordance with each of the cyan, magenta and yellow color printing signals C, M, and Y is supplied with toners from a corresponding one of the cyan, magenta and yellow developers 29, 30 and 31, to thereby develop the latent picture element image into a color toner picture element image.

In step S8, then, it is judged whether the entire area of the original image has been scanned to obtain the RGB original image color data for all the picture elements of the original image and the printing operations have been conducted to reproduce the entire area of the original image. If some area of the original image has not yet been reproduced, the steps S3 through S8 are repeatedly conducted. If the reproduction of the entire area of the original image has been completed, a recording sheet which has been supplied from the sheet supply case 36 is wound around the transfer drum 37, and the color toner image developed on the photosensitive drum 27 is transferred to the recording sheet. The recording sheet which has been subjected to the transfer operation is thermally fixed by the heat-fixing unit 38 by way of a sheet feeding operation of the sheet feed unit 40, and discharged out to the outlet tray On the other hand, residual toners on the photosensitive drum 27 are removed by the cleaner 35.

As described above, according to the image forming apparatus of the present invention, the printing control data is obtained on the basis of an information on a color state of human visual sense of a color on the original corresponding to the original image color data. Then, the printing control data control is the image recording portion. Therefore, it is possible to reproduce, with high reproducibility, a color of human visual sense on the original. Accordingly, it is possible to reproduce a color original image with excellent color-reproducibility irrespective of a kind of an original.

Although a preferred embodiment of the present invention has been shown and described in detail, it should be understood that various changes and modifications may be made therein without departing from the scope of the appended claims.

For example, in the above-described embodiment, the RGB-XYZ conversion expressions, the image input gamut data, the image output gamut data, and the XYZ-CMY relationship data are stored in the ROM 20 together with the (RGB-CMY) combination data. However, the ROM 20 may store therein only the (RGB-CMY) combination data groups, at the time when the copying machine 1 is in use. Therefore, the ROM 20 may store therein only the (RGB-CMY) combination data groups, at the time when the color image copying machine 1 is shipped from the manufacturer.

To the contrary, the RGB-XYZ conversion expressions, the image input gamut data, the image output gamut data, and the XYZ-CMY relationship data may only be stored in the ROM 20, as described below:

In the above-described embodiment, the (RGB-CMY) combination data groups are stored in the ROM 20. Therefore, when the original image is to be copied, each color actually formed on the original is merely subjected to the interpolative processing with using the selected (RGB-CMY) combination data, to obtain the printing control data. Accordingly, the image copying operation can be conducted in a short period of time. However, according to the present invention, it is unnecessary to store the (RGB-CMY) combination data groups in the ROM 20. In this case, the image copying operation is conducted such that the each picture element color actually formed on the original is directly subjected to the color-correcting process steps S12 through S22 of FIG. 5, with using the RGB-XYZ conversion expressions, the image output gamut data, the image input gamut data and the XYZ-CMY relationship data stored in the ROM 20. In other words, the image copying operation shown in FIG. 4 is performed, with the steps S4 through S6 thereof being replaced with the color-correcting steps S12 through S22 of FIG. 5.

More specifically, in this case, the RGB original image color data (R, G, B) obtained for each picture element color of the original image is first converted into the XYZ color data (X, Y, Z), using the above-described RGB-XYZ conversion expression stored in the ROM 20, the RGB-XYZ conversion expression corresponding to the kind of the original selected in the step S1. The XYZ color data is then converted into the L*a*b* color data which is then subjected to the color-compression process to obtain the color-compressed L*a*b* color data. The color-compressed L*a*b* color data is transformed into the color compressed XYZ color data, based on which of the corresponding CMY printing control data is calculated, using the above-described CMY-XYZ relationship data stored in the ROM 20. Thus, the CMY printing control data for each picture element color of the original image is obtained, and the printing operation is conducted.

Though the above embodiments are described representatively in a digital color copying machine, this invention may be applied to a color printer without the color original reading portion. In this case, the color printer of the present invention receives the RGB original image color data from outside. The color printer of the present invention obtains the CMY printing control data, on the basis of an information of a color state of human visual sense of a color corresponding to the RGB original image color data. Then, the color printer performs the printing operation with the CMY printing control data. Therefore, the color printer can accurately reproduce onto the recording sheet the color of human visual sense corresponding to the RGB original image color data.

Finally, the above embodiments utilize the cyan, magenta and yellow color recording process, however, a black color may be added to these three colors to perform the color recording process.

I claim:

1. A color image forming apparatus for reproducing a first picture element color data representative of a color of each picture element of an original color image formed on an image input medium and forming, on an image output medium, a color image corresponding to the original color image, said color image forming apparatus comprising:

input means for receiving the first picture element color data for the corresponding picture element color of the original color image;

control signal producing means for producing a control signal from the first picture element color data, on the basis of information of a color state, in a human visual sense as defined using the CIE 1931 standard colormetric system, of the each picture element color on the image input medium, the color state being determined dependently on both human visual sensitivity defined using the CIE 1931 standard colormetric system and a kind of the image input medium; and image recording means for recording the color image on the image output medium on the basis of the control signal, wherein said control signal producing means comprises:

storing means for storing a plurality of combination data, each group corresponding to a kind of the image input medium and consisting of a plurality of combination data, each combination data of the each group consisting of a first color data receivable by said input means and a record signal for controlling said image recording means to record a color corresponding to the first color data, the record signal being calculated on the basis of an information of a color state, in the human visual sense, of a color on the corresponding kind of the image input medium corresponding to the first color data; and selecting means including:

group selecting means for selecting one group out of the plural groups, in accordance with the kind of the image input medium; and combination data selecting means for selecting at least one combination data out of the plural combination data of group selected by said group selecting means, in accordance with the first picture element color data, to thereby produce control signal.

2. The color image forming apparatus as claimed in claim 1, wherein said storing means stores a plurality of combination data, each combination data consisting of the first color data receivable by said input means and the record signal for controlling said image recording means to record a color corresponding to the first color data, the record signal being calculated, on the basis of information of a color state, in the human visual sense, of a color on the image input medium corresponding to the first color data, the color state being determined dependently on both the human visual sensitivity and the kind of the image input medium; and said selecting means selects at least one combination data out of the plural combination data, in accordance with the first picture element color data, to thereby produce the control signal.

3. The color image forming apparatus as claimed in claim 1, wherein said control signal producing means further includes interpolative calculation means for calculating the control signal through an interpolative process on the basis of the selected combination data, to thereby produce the control signal.

4. The color image forming apparatus as claimed in claim 1, wherein the record signal is obtained by converting, in a conversion manner dependent on the kind of the image input medium, the first color data into a second color data representative of the color state, in the human visual sense, of a color on the image input medium corresponding to the first color data and color-correcting the second color data.

5. The color image forming apparatus as claimed in claim 4, wherein the second color data is defined with regard to color matching functions representative of the human visual sensitivity.

6. The color image forming apparatus as claimed in claim 5, wherein the conversion manner is determined dependently on spectral reflection characteristics of the image input medium.

7. The color image forming apparatus as claimed in claim 5, wherein the second color data is obtained by converting the first color data through a conversion manner determined dependently on a kind of the image input medium.

8. The color image forming apparatus as claimed in claim 5, wherein the second color data is defined in a CIE 1931 standard colorimetric system.

9. The color image forming apparatus as claimed in claim 4, wherein the conversion manner is in the form of a non-linear polynomial approximation expression determined dependently on the kind of the image input medium.

10. The color image forming apparatus as claimed in claim 5, wherein the record signal is obtained by converting the first color data into the second color data and color-compressing the second color data.

11. The color image forming apparatus as claimed in claim 1, wherein said input means includes reading means for reading the original color image on the image input medium to input the first picture element color data corresponding to the picture element color.

12. The color image forming apparatus as claimed in claim 1, wherein said control signal producing means converts, in a conversion manner dependent on the kind of the image input medium, the first picture element color data into a second picture element color data representative of the color state, in the human visual sense, of the picture element color on the image input medium and color-corrects the second picture element color data to form the control signal.

13. The color image forming apparatus as claimed in claim 12, wherein the second picture element color data is defined with regard to color matching functions representative of the human visual sensitivity.

14. The color image forming apparatus as claimed in claim 13, wherein the conversion manner is determined dependently on spectral reflection characteristics of the image input medium.

15. The color image forming apparatus as claimed in claim 13, wherein said control signal producing means converts the first picture element color data into the second picture element color data through a conversion manner determined dependently on a kind of the image input medium.

16. The color image forming apparatus as claimed in claim 13, wherein the second picture element color data is defined in a CIE 1931 standard colorimetric system.

17. The color image forming apparatus as claimed in claim 13, wherein the conversion manner is in the form of a non-linear polynomial approximation expression determined dependently on the kind of original.

18. The color image forming apparatus as claimed in claim 12, wherein said control signal producing means color-compresses the second picture element color data to form the control signal.

19. A color image forming apparatus for reproducing a first picture element color data representative of a color of each picture element of an original color image formed on an image input medium and forming, on an image output medium, a color image corresponding to the original color image, said color image forming apparatus comprising:

input means for receiving the first picture element color data of the corresponding picture element color of the original color image;

storing means for storing a plurality of groups of combination data, each group corresponding to a kind of the image input medium and consisting of a plurality of combination data, each combination data consisting of a first color data receivable by said input means and a record signal corresponding to the first color data, the record signal being calculated on the basis of a second color data representative of a color state, in a human visual sense as defined using the CIE 1931 standard colormetric system, of a color on the corresponding kind of the image input medium corresponding to the first color data;

group selecting means for selecting one group out of the plural groups, in accordance with the kind of the image input medium;

combination data selecting means for selecting at least one combination data out of the plural combination data in the group selected by said group selecting means, in accordance with the first picture element color data;

interpolative calculation means for calculating a control signal through an interpolative process on the basis of the selected combination data; and image recording means for recording a color image on the image output medium, on the basis of the control signal.

20. The color image forming apparatus as claimed in claim 19, wherein the record signal of each of the plurality of combination data of each group is obtained by converting, in a conversion manner dependent on the corresponding kind of the image input medium, the corresponding first color data into second color data representative of the color state, in the human visual sense, of a color on the image input medium indicated by the first color data and color-correcting the second color data.

21. The color image forming apparatus as claimed in claim 20, wherein the second color data is defined with regard to color matching functions representative of human visual sensitivity as defined using the CIE 1931 standard colormetric system.

22. The color image forming apparatus as claimed in claim 20, wherein the conversion manner is determined dependently on spectral reflection characteristics of the corresponding kind of image input medium.

23. The color image forming apparatus as claimed in claim 20, wherein the conversion manner is in the form of a non-linear polynomial approximation expression determined dependently on the corresponding kind of the image input medium.

24. The color image forming apparatus as claimed in claim 20, wherein the record signal is obtained by converting the corresponding first color data into the second color data and color-compressing the second color data.

* * * * *